(12) United States Patent
Zhang

(10) Patent No.: US 8,607,659 B2
(45) Date of Patent: Dec. 17, 2013

(54) ROBOTIC ARM ASSEMBLY

(75) Inventor: Guo-Qing Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 13/190,576

(22) Filed: Jul. 26, 2011

(65) Prior Publication Data

US 2012/0067150 A1   Mar. 22, 2012

(30) Foreign Application Priority Data

Sep. 16, 2010  (CN) .......................... 2010 1 0283622

(51) Int. Cl.
*B25J 17/00* (2006.01)
*B25J 17/02* (2006.01)
*B25J 18/00* (2006.01)

(52) U.S. Cl.
USPC .................. 74/490.04; 74/490.01; 901/19

(58) Field of Classification Search
USPC ......... 74/490.01, 490.04, 490.05; 901/15, 19, 901/23, 25, 26
See application file for complete search history.

(56) References Cited

U.S. PATENT DOCUMENTS

| 4,666,361 | A  | * | 5/1987  | Kitabatake et al. | 414/680   |
| 4,697,472 | A  | * | 10/1987 | Hiyane            | 74/490.02 |
| 2008/0216596 | A1 | * | 9/2008  | Madhani et al.    | 74/490.05 |
| 2009/0312870 | A1 | * | 12/2009 | Okuda et al.      | 700/258   |
| 2013/0125690 | A1 | * | 5/2013  | Long              | 74/423    |

FOREIGN PATENT DOCUMENTS

CN        101602208 A    12/2009

* cited by examiner

*Primary Examiner* — Justin Krause
(74) *Attorney, Agent, or Firm* — Altis Law Group, Inc.

(57) ABSTRACT

A robotic arm assembly includes a support body, a first segment, a second segment, a first driving device, a second driving device, a first bevel gear, a second bevel gear, a third bevel gear, a first transmission mechanism, and a second transmission mechanism. The first segment is rotatably connected to an end of the support body. The second segment is rotatably connected to the first segment. The first driving device and the second driving device are received in the support body. The first bevel gear and the second bevel gear are rotatably sleeved on opposite ends of the first segment, and mesh with the third bevel gear fixed to the second segment. The first transmission mechanism transmits the power of the first driving member to the first bevel gear, and the second transmission mechanism transmits the power of the second driving member to the second bevel gear.

12 Claims, 4 Drawing Sheets

ROBOTIC ARM ASSEMBLY

BACKGROUND

1. Technical Field

The present disclosure relates to robots and, particularly, to a robotic arm assembly.

2. Description of Related Art

Many robotic arms include a fixed base, a frame pivotably connected to the fixed base about a first rotation axis, a first segment, one end of which is pivotably connected to the frame about a second rotation axis, and a second segment, one end of which is pivotably connected to the other end of the first segment about a third rotation axis. An actuator, such as a detector, a welding device, a gripper, or a cutting tool, is mounted at a distal end of the second segment of the industrial robot to execute specific tasks. Generally, six axes are utilized to achieve maximum movement of the actuator.

In robots of this kind, each arm rotates around a rotation axis driven by a driving unit. Typically, the driving unit includes a motor mounted on the first segment and a speed reducer coupled to the motor to transmit the movement of the motor to the second segment. However, the robotic arm generally has a large axial size due to the motor and speed reducer, and a load weight of the robotic arm is relatively low.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
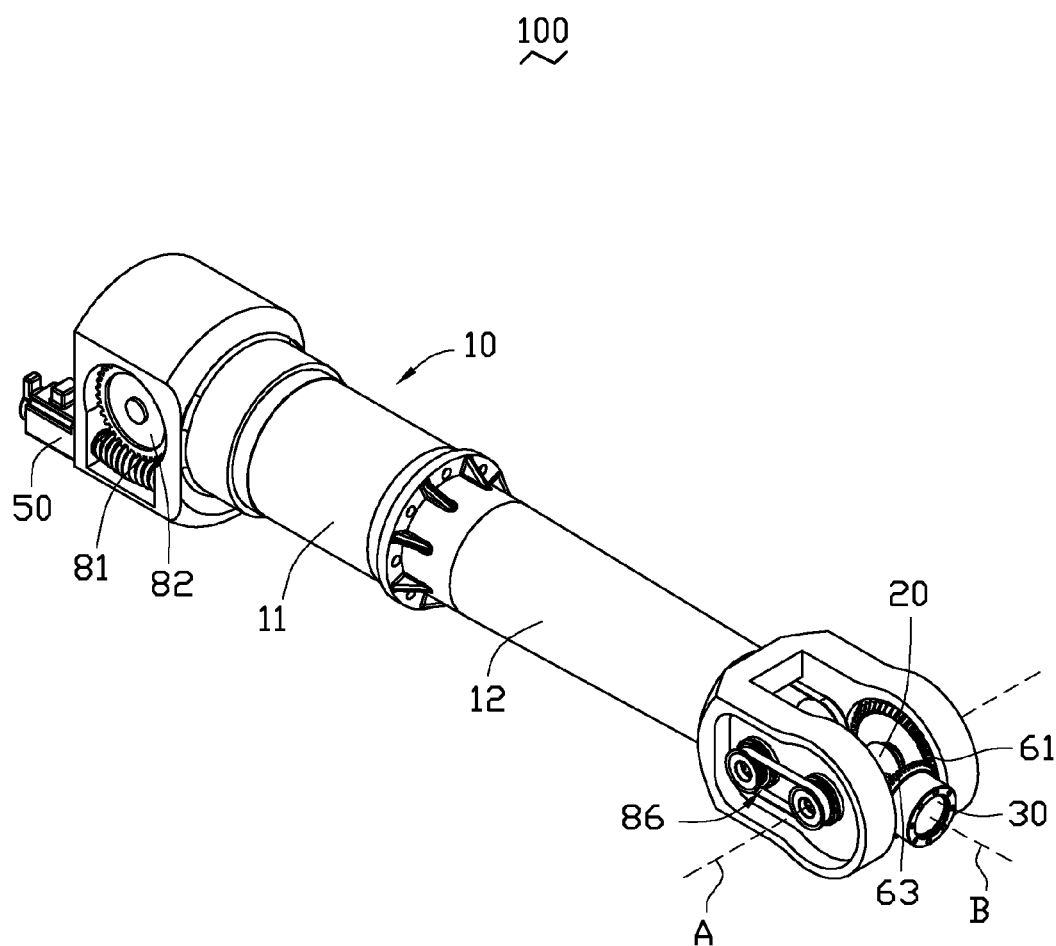
FIG. 1 is an assembled, isometric view of an embodiment of a robotic arm assembly including a support body, a first segment, and a second segment.

Referring to FIG. 1, an embodiment of a robotic arm assembly 100 includes a support body 10, a first segment 20 rotatably connected to an end of the support body 10, and a second segment 30 rotatably connected to the first segment 20. The robotic arm assembly 100 can be utilized in a six axes robot (not shown).

Figure 2:
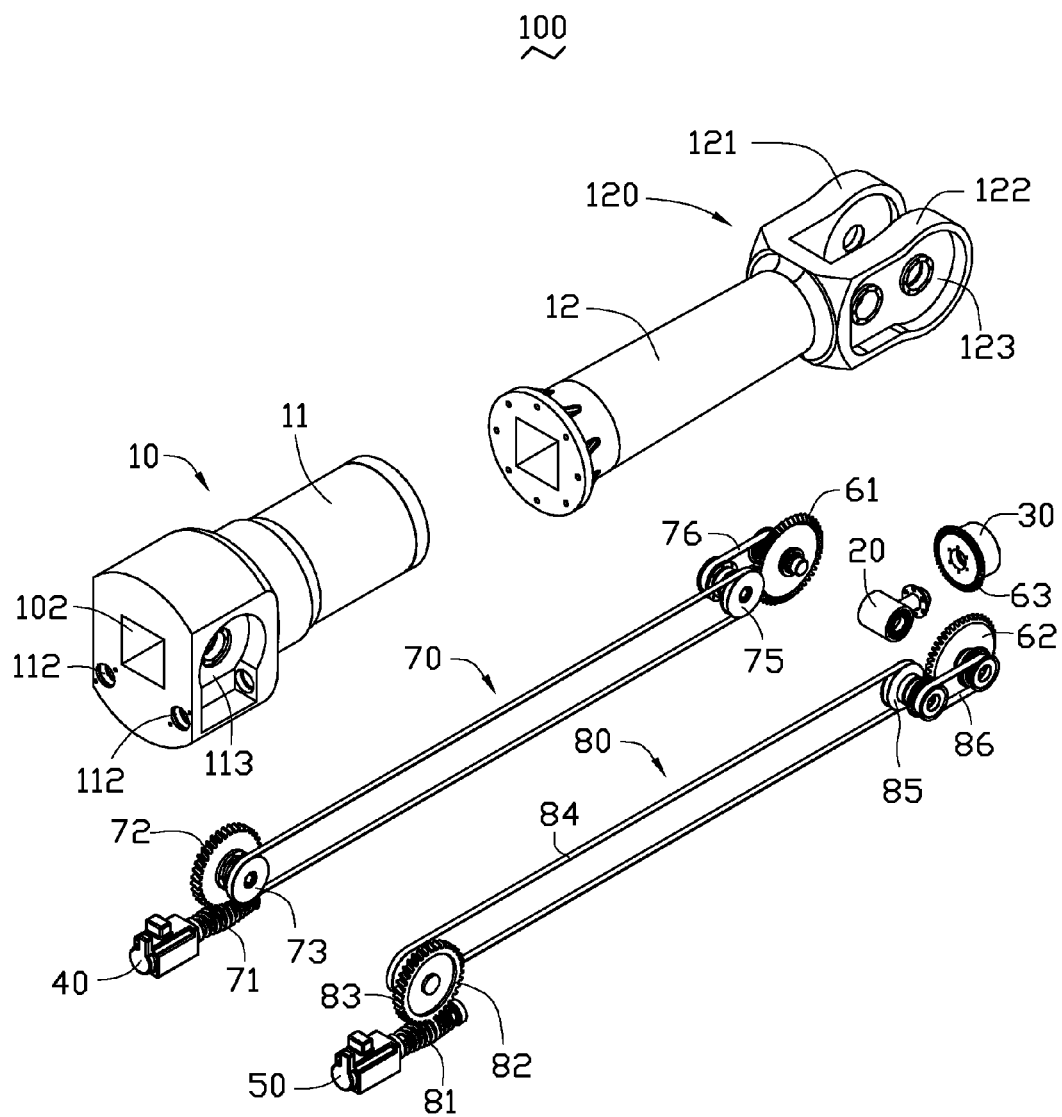
FIG. 2 is an exploded, isometric view of the robotic arm assembly of FIG. 1.
Figure 3:
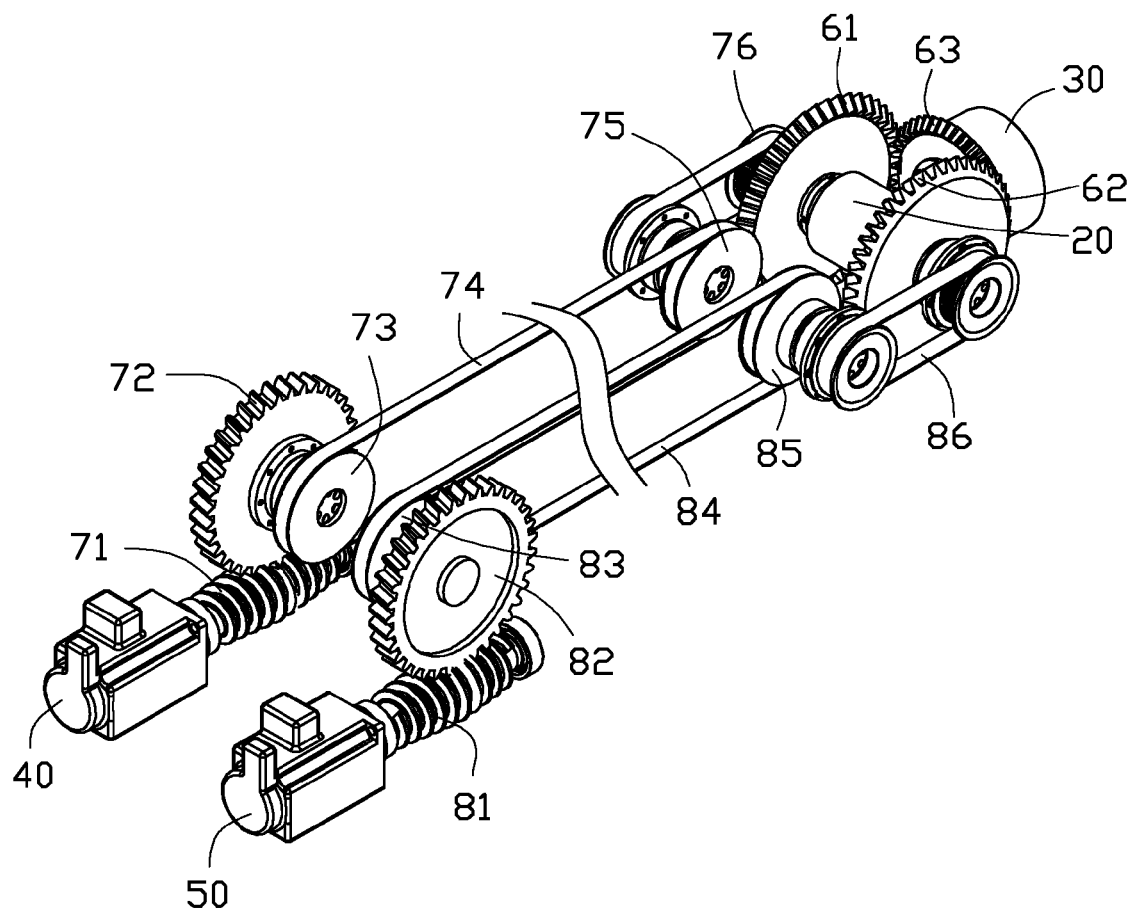
FIG. 3 is an isometric view of the robotic arm assembly of FIG. 1 shown without the support body.
Figure 4:
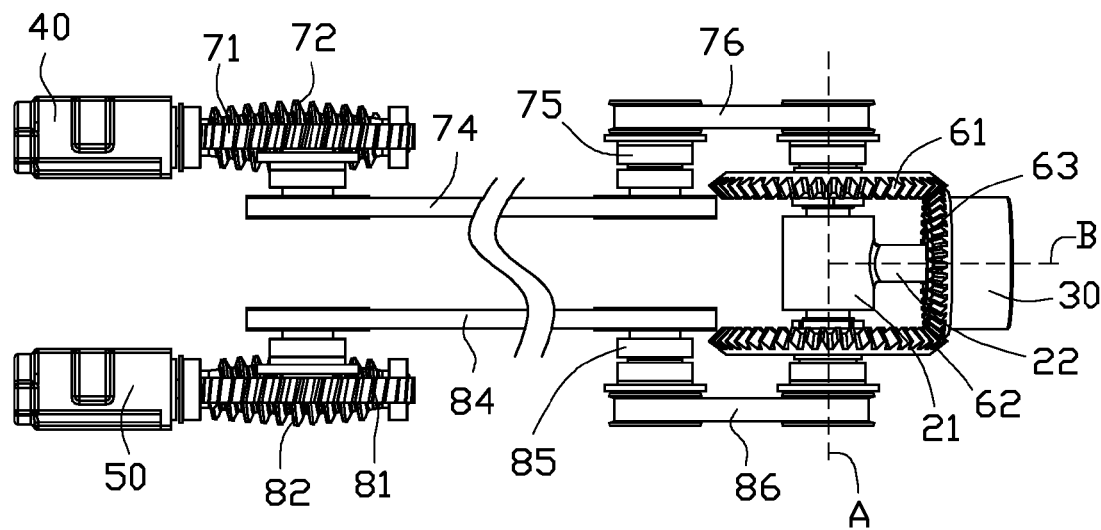
FIG. 4 is a top view of the robotic arm assembly of FIG. 3.

Referring to FIGS. 2 through 4, the robotic arm assembly 100 further includes a first driving member 40, a second driving member 50, a first bevel gear 61, a second bevel gear 62, a third bevel gear 63, a first transmission mechanism 70, and a second transmission mechanism 80. The first driving member 40 and the second driving member 50 are received in the support body 10. The first bevel gear 61 and the second bevel gear 62 are rotatably sleeved on opposite ends of the first segment 20. The third bevel gear 63 is fixed to one end of the second segment 30. The first transmission mechanism 70 transmits the power of the first driving member 40 to the first bevel gear 61. The second transmission mechanism 80 transmits the power of the second driving member 50 to the second bevel gear 62. The third bevel gear 63 is meshed with the first bevel gear 61 and the second bevel gear 62, and thus the first bevel gear 61, the second bevel gear 62, the third bevel gear 63, and the first segment 20 cooperatively form a differential gear train (not labeled), with the first segment 20 taken as a connecting rod of the differential gear train.

The first driving member 40 transmits power to the first bevel gear 61 via the first transmission mechanism 70, and the second driving member 50 transmits power to the second bevel gear 62 via the second transmission mechanism 70, such that the power of the first driving member 40 and the second driving member 50 is used as input power of the differential gear train. When the first bevel gear 61 and the second bevel gear 62 rotate at a predetermined speed, the first segment 20 and the second segment 30 can move according to predetermined paths. In detail, the first segment 20 rotates about a first axis A, and the second segment 30 rotates about a second axis B. Because the first bevel gear 61 and the second bevel gear 62 cooperatively support the third bevel gear 63 and transmits power when the first segment 20 and the second segment 30 rotate, a load weight of the robotic arm assembly 100 can be relatively high, and a size of the robotic arm assembly 100 can be reduced due to the compact structure of the differential gear train.

Referring to FIG. 2 again, the support body 10 includes a first support arm 11 and a second support arm 12 detachably fixed to the first support arm 11. The support body 10 can define a pivot hole 102 extending through the first support arm 11 and the second support arm 12.

The second support arm 12 forms an assembly portion 120 at an end away from the first support arm 11. The assembly portion 120 is substantially U-shaped, and includes a first assembly plate 121 and a second assembly plate 122 opposite to the first assembly plate 12. The first segment 20 is rotatably positioned between the first assembly plate 121 and the second assembly plate 122. Referring to FIG. 4, the first segment 20 includes a main body 21 and a connecting portion 22 extending from a middle portion of the main body 21.

Opposite ends of the main body 21 are rotatably connected to the first bevel gear 61 and the second bevel gear 62, respectively. The connecting portion 22 is rotatably connected to the second segment 30.

In the illustrated embodiment, the first transmission mechanism 70 and the second transmission mechanism 80 has the same structure. The first transmission mechanism 70 can include a first worm 71 coupled to the first driving member 40, a first worm gear 72 meshing with the first worm 71, a first drive wheel 73 driven by the first worm gear 72, a first action gear 75, a first flexible member 74 sleeved on the first drive wheel 73 and the first action gear 75, and a first transmission subassembly 76 connecting the first action gear 75 to the first bevel gear 61. The first flexible member 74 can be selected from a steel strip, an asynchronous belt, and a steel rope.

The second transmission mechanism 80 can include a second worm 81 coupled to the second driving member 80, a second worm gear 82 meshing with the second worm 81, a second drive wheel 83 driven by the first worm gear 82, a second action gear 85, a second flexible member 84 sleeved on the first drive wheel 83 and the second action gear 85, and a second transmission subassembly 86 connecting the second action gear 85 to the second bevel gear 62.

To conveniently assemble the first transmission mechanism 70 and the second transmission mechanism 80, the first support arm 11 axially defines two assembly holes 112 in a back end, and defines two first receiving grooves 113 on opposite sides. The assembly holes 112 communicate with the first receiving grooves 113. The first driving member 40 and the second driving member 50 are assembled in the back end of the first support arm 11, and output shafts of the first driving member 40 and the second driving member 50 extend into the assembly holes 112 of the first support arm 11. The first worm 71 and the first worm gear 72 are received in one first receiving groove 113, and the second worm 81 and the second worm gear 82 are received in the other first receiving groove 113. Either the first assembly plate 121 or the second assembly plate 122 defines a second receiving groove 123. The first transmission subassembly 76 is received in the receiving groove 123 of the first assembly plate 121, and the second transmission subassembly 86 is received in the receiving groove 123 of the second assembly plate 122. The first flexible member 74 and the second flexible member 84 are received in the pivot hole 102 of the support body 10. In the illustrated embodiment, the first driving member 40 and the second driving member 50 are servo motors.

The first transmission mechanism 70 and the second transmission mechanism 80 may have different structures. The first driving member 40 and the second driving member 50 can also be positioned in a front end of the second support arm 12, and if so, the first transmission subassembly 76 and the second transmission subassembly 86 are directly driven by the first driving member 40 and the second driving member 50. In addition, the support body 10 can be integrally formed.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robotic arm assembly, comprising:
    a support body;
    a first segment rotatably connected to an end of the support body; and
    a second segment rotatably connected to the first segment;
    a first driving member and a second driving member received in the support body;
    a first bevel gear and a second bevel gear rotatably sleeved on opposite ends of the first segment;
    a third bevel gear fixed to the second segment and meshing with the first bevel gear and the second bevel gear;
    a first transmission mechanism transmitting the power of the first driving member to the first bevel gear; and
    a second transmission mechanism transmitting the power of the second driving member to the second bevel gear;
    wherein the first transmission mechanism comprises a first worm coupled to the first driving, member, a first worm (sear meshing with the first worm a first drive wheel driven by the first worm gear, a first action gear, a first flexible member sleeved on the first drive wheel and the first action gear, and a first transmission subassembly connecting the first action gear to the first bevel gear;
    wherein the second transmission mechanism comprises a second worm coupled to the second driving member, a second worm gear meshing with the second worm, a second drive wheel driven by the first worm gear a second action gear, a second flexible member sleeved on the first drive wheel and the second action gear, and a second transmission subassembly connecting the second action gear to the second bevel gear, and
    wherein the support both comprises a first support arm and a second support arm detachably fixed to the first support arm, the first support arm defines two first receiving grooves on opposite sides the first worn and the first worm rear are received in one first receiving groove, and the second worm and the second worm gear are received in the other first receiving groove.

2. The robotic arm assembly of claim 1, wherein the first flexible member is selected from the group consisting of a steel strip, an asynchronous belt, and a steel rope.

3. The robotic arm assembly of claim wherein the second flexible member is selected from the group consisting of a steel strip, an asynchronous belt, and a steel rope.

4. The robotic arm assembly of 1, wherein the second support arm defines two second receiving grooves on opposite sides, the first transmission subassembly is received in one second receiving groove, and the second transmission subassembly is received in the other second receiving groove.

5. The robotic arm assembly of claim 1, wherein the support body defines a pivot hole, the first flexible member and the second flexible member being received in the pivot hole.

6. The robotic arm assembly of claim 1 ,wherein the first segment comprises a main body and a connecting portion extending from a middle portion of the main body; opposite ends of the main body are rotatably connected to the first bevel gear and the second bevel gear, respectively, and the connecting portion is rotatably connected to the second segment.

7. A robotic arm assembly, comprising:
    a support body;
    a first segment rotatable connected to an end of the support body; and
    a second segment rotatably connected to the first segment
    a first driving member and a second driving member received in the support body; and
    a differential gear train received in the support body, comprising:
    a first bevel gear driven by the first driving member;
    a second bevel gear driven by the second driving member and connected to the first bevel gear;
    a third bevel gear fired to the second segment and meshing with the first bevel gear and the second bevel gear;
    wherein the first transmission mechanism rise a first worm coupled to the first driving member a first worm gear meshing with the first worm, a first drive wheel driven by the first worm gear, a first action gear, a first flexible member sleeved on the first drive wheel and the first action gear, and a first transmission subassembly connecting the first action gear to the first bevel gear,
    wherein the second transmission mechanism comprises a second worm coupled to the second driving member, a second worm gear meshing with the second worm, a second drive wheel driven by the first worm gear a second action gear, a second flexible member sleeved on the first drive wheel and the second action gear, and a second transmission subassembly connecting the second action gear to the second bevel gear, and
    wherein the support body comprises a first support arm and a second support arm detachably fixed to the first support arm the first support arm defines two first receiving grooves on opposite sides, the first worm and the first worm gear are received in one first receiving groove, and the second worm and the second worm gear are received in the other first receiving groove.

8. The robotic arm assembly of claim 7, wherein the first flexible member is selected from the group consisting of a steel strip, an asynchronous belt, and a steel rope.

9. The robotic aim assembly of claim 7, wherein the second flexible member is selected from the group consisting of a steel strip, an asynchronous belt, and a steel rope.

10. The robotic arm assembly of 7, wherein the second support arm defines two second receiving grooves on opposite sides, the first transmission subassembly is received in one second receiving groove, and the second transmission subassembly is received in the other second receiving groove.

11. The robotic arm assembly of claim 7, wherein the support body defines a pivot hole, the first flexible member and the second flexible member being received in the pivot hole.

12. The robotic arm assembly of claim 7, wherein the first segment comprises a main body and a connecting portion extending from a middle portion of the main body, opposite ends of the main body are rotatably connected to the first bevel gear and the second bevel gear, respectively, and the connecting portion is rotatably connected to the second segment.

* * * * *